(No Model.)
T. COLDWELL.
LAWN MOWER.
No. 475,976. Patented May 31, 1892.
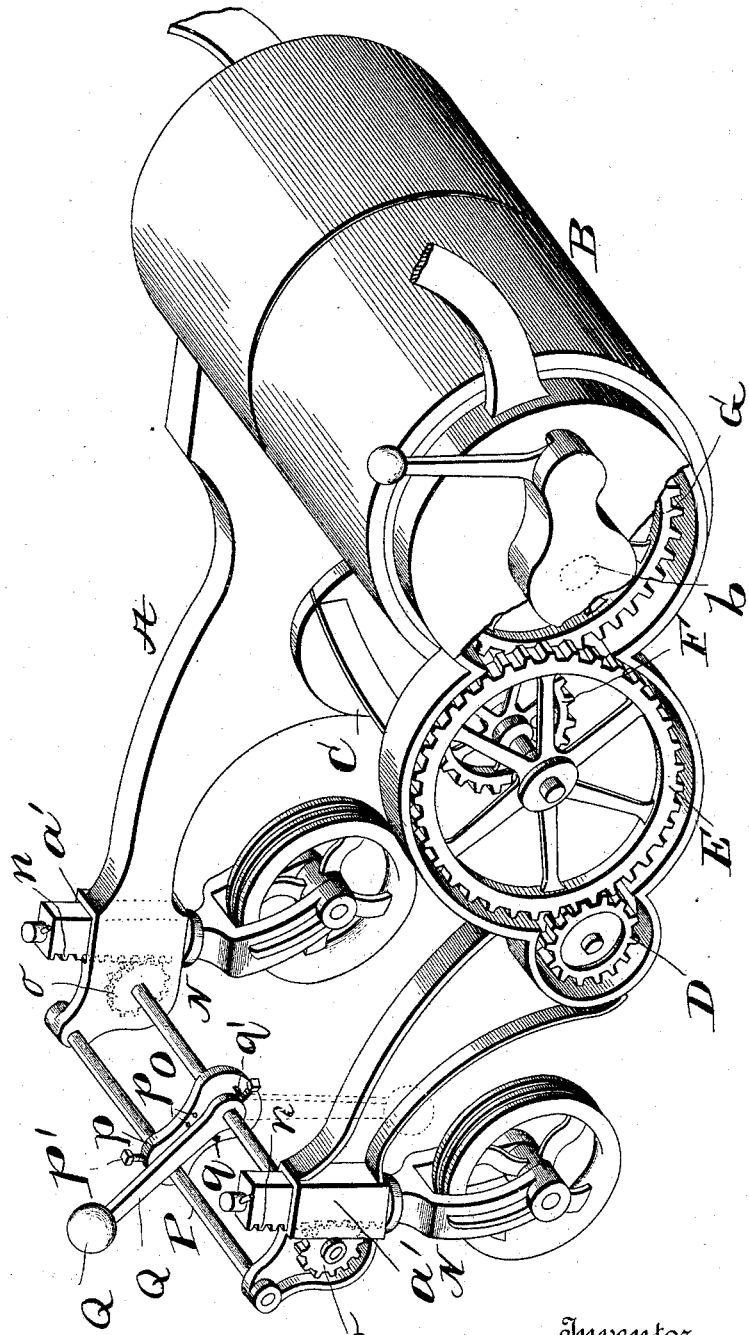
Witnesses
G. A. Tauberschmidt
J. D. Kingsbery
Inventor
Thomas Coldwell
By Whitaker & Prevost Attorneys
THE NORRIS PETERS CO., PHOTO-LITHO., WASHINGTON, D. C.

UNITED STATES PATENT OFFICE.

THOMAS COLDWELL, OF NEWBURG, NEW YORK.

LAWN-MOWER.

SPECIFICATION forming part of Letters Patent No. 475,976, dated May 31, 1892.

Application filed February 10, 1892. Serial No. 420,979. (No model.)

*To all whom it may concern:*

Be it known that I, THOMAS COLDWELL, a citizen of the United States, residing at Newburg, in the county of Orange and State of New York, have invented certain new and useful Improvements in Lawn-Mowers; and I do hereby declare the following to be a full, clear, and exact description of the invention, such as will enable others skilled in the art to which it appertains to make and use the same.

My invention is an improvement in lawn-mowers; and it consists in the novel features of construction and combination of parts hereinafter fully described.

In the accompanying drawing I have shown one form in which I have contemplated embodying my invention, and said invention is fully disclosed in the following description and claims.

Referring to the said drawing, the figure represents a perspective view of a lawn-mower embodying my invention.

In the drawing I have illustrated a lawn-mower intended to be drawn by a horse or horses; but it is obvious that my improvements are applicable to hand lawn-mowers as well and may be applied thereto, if desired.

Referring to the said drawing and the reference characters marked thereon, A represents the frame-work of the machine, which is of ordinary or preferred construction.

B is the driving-roller, $b$ the driving-shaft, and C the cutter driven from the driving-shaft by means of a train of gears D E F G in the customary manner, the gear-wheel G being mounted loosely upon the driving-shaft $b$ and adapted to be clutched thereto in any ordinary or preferred manner to impart motion to said train of gears and to the cutter.

The forwardly-extending arms of the frame are provided with guides $a'$, having square or polygonal apertures therethrough to receive the adjustable caster-wheel blocks or supports N. These blocks are each provided with a toothed rack $n$, preferably on the front edge, and are perforated vertically to receive the shanks or stems of the caster-wheels, which are firmly secured to and held from movement with respect to the blocks by a flange below said blocks and a pin passing through said stems above said blocks. This construction permits the stems of the caster-wheels to turn in the blocks N, but prevents the said stems from being disengaged therefrom. A horizontal shaft O extends transversely across the machine and is provided adjacent to either end with a pinion $o$, secured thereto and engaging the rack $n$ of the block N, located at that side of the machine, the guides $a'$ of the machine being cut away to permit the teeth of the pinion and rack to intermesh. It will therefore be readily seen that by rotating the shaft O the blocks N will be raised or lowered in their guides $a'$.

I prefer to provide the frame of the machine with a transverse brace-bar P, connecting the front extremities of the frame, as shown, and to this bar I secure a plate $p$, which has a perforated portion engaging the cross-bar P and a suitable aperture which loosely engages the shaft O, the said plate being secured rigidly to the cross-bar P by a set-screw $p'$ or other device.

An operating-lever Q, provided with a counterbalance-weight Q' at its outer end, is secured to the shaft O by a set-screw or other means adjacent to the plate $p$, and said plate is provided with a series of apertures $p^2$, which are adapted to receive stop-pins. When the frame is in its lowest position, the lever Q will engage a pin $q$, inserted in the aperture farthest forward, or it may rest upon the cross-bar P. If the lever Q be moved rearwardly, the shaft O and pinions $o$ will be rotated and the blocks N will be depressed with respect to the frame, thereby raising the frame and elevating the cutter. The cutter can thus be accurately and quickly adjusted to and held in any desired position by moving the lever Q and placing a pin $q$ in one of the apertures $p^2$, just forward of the lever. When it is desired to raise the cutter above the ground so that it shall not be struck by obstacles, the lever Q is moved rearwardly and downwardly into the position shown in dotted lines, where it may be held by a pin $q'$, or I may form the weight of sufficient size, so that the lever Q will be held in its downward position by gravity. In such case the pins $q$ need only be used for adjusting the height of cut, and the weighted lever may be simply moved from the position shown in full lines to that shown in dotted lines, and vice versa, being held in either position by the weight.

I provide a weight for the lever Q, proportioned to counterbalance the weight sustained by the caster-wheels, so that when the lever is moved rearwardly the weight will of itself cause the lever to descend to its lowest position and raise the frame and maintain it in its highest position. This can be done on a horse lawn-mower by the driver without leaving his seat. When the lever is raised and thrown forward, and the frame thereby lowered to bring the cutter into operative relation with the ground, the lever Q will rest against the front cross-bar P and will be securely held in that position by the counterbalance-weight. By employing the counterbalance-weight it will be seen that the raising and lowering of the frame and cutter can be instantly effected by a single movement of the lever Q and the weight will hold the lever in either of its extreme positions, thereby making any additional securing devices unnecessary. If it is desired to raise the height of cut, a pin can be set in one of the holes $p^2$ of the plate $p$, and the counterbalance-weight will then hold the lever in engagement with said pin, instead of the bar P.

The lever Q will be adjusted on the shaft O by means of its set-screw in such manner that when said lever is thrown forward and rests against the cross-bar P the cutter will be held at the desired height from the ground, and this height may be varied by adjusting the lever with respect to said shaft. The pins $q\ q$ will ordinarily be employed to adjust the cutter, as above described, when it is desired to change the height of cut temporarily. It will also be seen that when the lever O is in a position forward of the shaft the weight of the machine, acting on the shaft O, by means of the racks and pinions, tends to force it in a forward direction in addition to the counterbalance-weight, so that the lever would be held in position against one of the pins $q$ even if it stood almost vertically with respect to the shaft O.

I do not desire to be limited to the exact details of construction herein described and shown, as variations might be made in the same without departing from the spirit of my invention.

What I claim, and desire to secure by Letters Patent, is—

1. In a lawn-mower, the combination, with the frame provided with guides adjacent to the sides of the machine, of blocks movable vertically in said guides, caster-wheels pivoted in said blocks, a weighted lever whose weight is proportioned to counterbalance the burden on the said wheels, and connections between said lever and each of said blocks, whereby the movement of the said lever will raise or lower the said wheels and the weight serve to hold them in the position desired, substantially as described.

2. In a lawn-mower, the combination, with the frame provided with vertically-movable blocks provided with racks, of the caster-wheels pivotally secured to said blocks, the shaft provided with pinions engaging said racks, and adjusting mechanism, including a weighted lever connected with said shaft, the weight of said lever being proportioned to counterbalance the burden carried by said wheels, substantially as described.

3. In a lawn-mower, the combination, with the frame, of caster-wheels movably supported with respect to the frame adjacent to the sides thereof, the shaft connected to said caster-wheels for moving the same with respect to said frame, a weighted counterbalance-lever secured to said shaft, and the plate provided with adjusting apertures and pins, substantially as described.

In testimony whereof I affix my signature in presence of two witnesses.

THOMAS COLDWELL.

Witnesses:
 JOS. COLDWELL,
 WILLIAM S. WINANS.